(12) United States Patent
Simpson et al.

(10) Patent No.: US 11,441,426 B2
(45) Date of Patent: Sep. 13, 2022

(54) VALVE ASSEMBLY CONFIGURED WITH MANIFOLD HAVING EUTECTIC PLUG

(71) Applicant: Hamilton Sundstrand Corporation, Charlotte, NC (US)

(72) Inventors: Scott W. Simpson, Feeding Hills, MA (US); David J. Zawilinski, West Granby, CT (US); Robert DeFelice, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/244,217

(22) Filed: Apr. 29, 2021

(65) Prior Publication Data

US 2021/0340873 A1    Nov. 4, 2021

Related U.S. Application Data

(60) Provisional application No. 63/017,997, filed on Apr. 30, 2020.

(51) Int. Cl.
*F01C 21/06*    (2006.01)

(52) U.S. Cl.
CPC .................................. *F01C 21/06* (2013.01)

(58) Field of Classification Search
CPC ...... F01C 21/06; F15B 13/0807; F15B 20/00; F15B 2211/31558; F15B 2211/86; F15B 2211/8752; F16K 17/383; F16K 27/003; F16K 31/124; F16K 31/42; F16K 49/00
USPC .......................................................... 60/785
See application file for complete search history.

(56) References Cited

U.S. PATENT DOCUMENTS

| | | | | |
|---|---|---|---|---|
| 2,573,983 | A | * | 11/1951 | Ofeldt ..................... B05B 15/00 239/113 |
| 2,600,977 | A | | 6/1952 | De Frees |
| 2,859,758 | A | * | 11/1958 | Jurs ....................... F16K 17/383 62/50.7 |

(Continued)

FOREIGN PATENT DOCUMENTS

JP    2002195499 A    7/2002

OTHER PUBLICATIONS

European Search Report Issued in European Application No. 21171601. 4-1015 dated Oct. 4, 2021; 7 Pages.

*Primary Examiner* — J. Todd Newton
(74) *Attorney, Agent, or Firm* — Cantor Colburn LLP

(57) ABSTRACT

Disclosed is a valve assembly with: a valve body defining valve inlet and outlet ports; a manifold connected to the valve outlet port, the manifold includes: a manifold inlet body portion defining: a manifold internal surface forming a manifold channel; and a first manifold external surface defining a manifold inlet opening that opens to the manifold channel, the manifold channel is fluidly coupled to the valve outlet port via the manifold inlet opening; a manifold outlet port, and a manifold outlet conduit extending from the manifold inlet body portion to the manifold outlet port; a manifold exhaust port, and a manifold exhaust conduit extending from the manifold inlet body portion to the manifold exhaust port, the manifold exhaust and outlet conduits are fluidly coupled to each other via the manifold channel, heat fins extend from the manifold exhaust conduit; and a eutectic plug disposed within the manifold exhaust conduit.

20 Claims, 10 Drawing Sheets

(56) References Cited

U.S. PATENT DOCUMENTS

| | | | | |
|---|---|---|---|---|
| 3,638,733 | A | * | 2/1972 | De Rouville ........ A62C 99/009 137/72 |
| 5,039,006 | A | | 8/1991 | Habegger |
| 5,042,520 | A | | 8/1991 | Reznik |
| 5,511,576 | A | * | 4/1996 | Borland ................ F16K 17/383 137/72 |
| 5,647,390 | A | * | 7/1997 | Wass .................... F16K 17/383 137/68.12 |
| 5,941,269 | A | * | 8/1999 | Ingle .................... F16K 17/383 137/79 |
| 2009/0038687 | A1 | * | 2/2009 | Kremer ................ F16K 17/383 137/74 |
| 2009/0293958 | A1 | * | 12/2009 | Weatherly ............ F16K 17/383 137/79 |

* cited by examiner

VALVE ASSEMBLY CONFIGURED WITH MANIFOLD HAVING EUTECTIC PLUG

CROSS-REFERENCE TO RELATED APPLICATIONS

This application claims the benefit of U.S. Provisional Application No. 63/017,997 filed Apr. 30, 2020, the disclosure of which is incorporated herein by reference in its entirety.

BACKGROUND

Exemplary embodiments of the present disclosure pertain to the art of valves and more specifically to a valve assembly configured with a manifold having a eutectic plug.

An aircraft engine bleed air system may include a shutoff valve that may operate between an opened state and a closed state to regulate airflow and pressure extracted from an engine compressor stage. The bleed air systems may utilize a servo valve to control the shutoff valve. The servo valve should remain reliably operable when exposed to extreme environmental conditions, e.g., of high temperature and pressure, to enable predictable operation of the shutoff valve.

BRIEF DESCRIPTION

Disclosed is a valve assembly includes: a valve having a valve body, the valve body defining a valve inlet port, a valve outlet port, and a valve flow control member operationally disposed between the valve inlet port and the valve outlet port; a manifold connected to the valve body at the valve outlet port, wherein the manifold includes: a manifold inlet body portion defining: a manifold internal surface defining a manifold channel extending at least partially along a first axis; and a first manifold external surface defining a manifold inlet opening that opens to the manifold channel, wherein the manifold channel is fluidly coupled to the valve outlet port via the manifold inlet opening; a manifold outlet port, and a manifold outlet conduit extending along a second axis from the manifold inlet body portion to the manifold outlet port; a manifold exhaust port, and a manifold exhaust conduit extending along a third axis from the manifold inlet body portion to the manifold exhaust port, wherein the manifold exhaust and manifold outlet conduits are fluidly coupled to each other via the manifold channel, and wherein heat fins extend radially outward from the manifold exhaust conduit between the manifold inlet body portion and the manifold exhaust port; and a plug disposed within the manifold exhaust conduit at the manifold exhaust port, wherein the plug is formed of a eutectic material.

In addition to one or more of the above disclosed aspects of the valve assembly, or as an alternate, the manifold inlet body portion and the manifold exhaust conduit together define a manifold height along the third axis, and the valve assembly further includes: a motor operationally connected to the valve flow control member; and wherein the motor and the valve body together define a valve height along the third axis, and wherein the manifold height is greater than the valve height.

In addition to one or more of the above disclosed aspects of the valve assembly, or as an alternate, the valve assembly includes: a thermal spacer between the manifold and the valve body.

In addition to one or more of the above disclosed aspects of the valve assembly, or as an alternate, the manifold inlet body portion defines a second manifold external surface spaced apart from the first manifold external surface along the first axis; and the second manifold external surface defines a bolt opening to the manifold channel.

In addition to one or more of the above disclosed aspects of the valve assembly, or as an alternate, the valve assembly of further includes a bolt that has head and a shank, wherein the shank includes: first and second shank ends, spaced apart from each other along the first axis, wherein the head is formed at the first shank end, wherein the bolt extends into the manifold channel through the bolt opening, out of the manifold channel and the manifold inlet opening, through the thermal spacer, and into the valve outlet port to secure the manifold to the valve body.

In addition to one or more of the above disclosed aspects of the valve assembly, or as an alternate, the shank further includes: a shank outer cylindrical wall that extends axially between the first and second shank ends to define a shank channel therethrough, wherein: the second shank end of the shank outer cylindrical wall defines a shank axial port that opens to the shank channel; the shank outer cylindrical defines first and second shank radial through holes that extend radially outward therethrough; and the first and second shank radial through holes are respectively aligned with the manifold outlet and manifold exhaust conduits.

In addition to one or more of the above disclosed aspects of the valve assembly, or as an alternate, the valve assembly further includes first and second shank O-rings, wherein: a shank outer surface defines a first shank annular groove, axially intermediate the second shank end and the first and second shank radial through holes; and the first manifold external surface of the manifold inlet body portion defines a first manifold inlet body O-ring groove about the manifold inlet opening, wherein: the first shank O-ring is configured to be seated between the first shank annular groove and the first manifold inlet body O-ring groove; the second shank O-ring is configured to be seated between the first shank annular groove and a valve O-ring groove formed about the valve outlet port; and the thermal spacer is configured to be seated between the first and second shank O-rings in the first shank annular groove.

In addition to one or more of the above disclosed aspects of the valve assembly, or as an alternate, the valve assembly further includes a third shank O-ring, wherein: the shank outer surface defines a second shank annular groove, located at the first shank end; and the second manifold external surface of the manifold inlet body portion defines a second manifold inlet body O-ring groove about the bolt opening, wherein the third shank O-ring is seated between the second shank annular groove and the second manifold inlet body O-ring groove.

In addition to one or more of the above disclosed aspects of the valve assembly, or as an alternate a portion of the manifold exhaust port is formed by a plug fitting, wherein the plug fitting defines a plug fitting conduit with the plug disposed therein, and is separable from the manifold exhaust conduit; and the plug fitting defines a plug fitting stem that is configured to be received within the manifold exhaust conduit to secure the plug fitting thereto.

In addition to one or more of the above disclosed aspects of the valve assembly, or as an alternate, the valve assembly further includes: a plug fitting O-ring, wherein the plug fitting stem defines a plug fitting O-ring groove on its outer surface that is configured to seat the plug fitting O-ring, and wherein the plug fitting O-ring is disposed between the plug fitting O-ring groove and a complimentary exhaust conduit groove formed in the axial outer end of the manifold exhaust conduit.

In addition to one or more of the above disclosed aspects of the valve assembly, or as an alternate, a portion of the manifold outlet port is formed by a tube fitting, wherein the tube fitting is separable from the manifold outlet conduit; and the tube fitting defines a tube fitting conduit having a tube fitting stem that is configured to be received within the manifold outlet conduit to secure the tube fitting thereto.

In addition to one or more of the above disclosed aspects of the valve assembly, or as an alternate, the valve assembly further includes a tube fitting O-ring, wherein the tube fitting stem defines a tube fitting O-ring groove on its outer surface that is configured to seat the tube fitting O-ring, wherein the tube fitting O-ring is disposed between the tube fitting O-ring groove and a complimentary outlet conduit groove formed in the axial outer end of the manifold outlet conduit.

Further disclosed is an aircraft engine bleed air system, including: a shutoff valve connected between one of high pressure and low pressure engine bleed air conduits and an aircraft subsystem; a valve assembly operationally connected to the shutoff valve, the valve assembly comprising: a valve having a valve body, the valve body defining a valve inlet port, a valve outlet port, and a valve flow control member operationally disposed between the valve inlet port and the valve outlet port; a manifold connected to the valve body at the valve outlet port, wherein the manifold includes: a manifold inlet body portion defining: a manifold internal surface defining a manifold channel extending at least partially along a first axis; and a first manifold external surface defining a manifold inlet opening that opens to the manifold channel, wherein the manifold channel is fluidly coupled to the valve outlet port via the manifold inlet opening; a manifold outlet port, and a manifold outlet conduit extending along a second axis from the manifold inlet body portion to the manifold outlet port; a manifold exhaust port, and a manifold exhaust conduit extending along a third axis from the manifold inlet body portion to the manifold exhaust port, wherein the manifold exhaust and manifold outlet conduits are fluidly coupled to each other via the manifold channel, and wherein heat fins extend radially outward from the manifold exhaust conduit between the manifold inlet body portion and the manifold exhaust port; and a plug disposed within the manifold exhaust conduit at the manifold exhaust port, wherein the plug is formed of a eutectic material, wherein the valve inlet port is fluidly coupled to the one of the high and low pressure engine bleed air conduits and the valve outlet port is operationally connected to the shutoff valve.

In addition to one or more of the above disclosed aspects of the aircraft engine bleed air system, or as an alternate, the manifold inlet body portion and the manifold exhaust conduit together define a manifold height along the third axis, and the valve assembly further includes: a motor operationally connected to the valve flow control member; and wherein the motor and the valve body together define a valve height along the third axis, and wherein the manifold height is greater than the valve height.

In addition to one or more of the above disclosed aspects of the aircraft engine bleed air system, or as an alternate, the aircraft engine bleed air system includes a thermal spacer between the manifold and the valve body.

In addition to one or more of the above disclosed aspects of the aircraft engine bleed air system, or as an alternate, the manifold inlet body portion defines a second manifold external surface spaced apart from the first manifold external surface along the first axis; and the second manifold external surface defines a bolt opening to the manifold channel.

In addition to one or more of the above disclosed aspects of the aircraft engine bleed air system, or as an alternate, the aircraft engine bleed air system further includes a bolt that has a head and a shank, wherein the shank includes: first and second shank ends, spaced apart from each other along the first axis, wherein the head is formed at the first shank end, wherein the bolt extends into the manifold channel through the bolt opening, out of the manifold channel and the manifold inlet opening, through the thermal spacer, and into the valve outlet port to secure the manifold to the valve body.

In addition to one or more of the above disclosed aspects of the aircraft engine bleed air system, or as an alternate, the shank further includes: a shank outer cylindrical wall that extends axially between the first and second shank ends to define a shank channel therethrough, wherein: the second shank end of the shank outer cylindrical wall defines a shank axial port that opens to the shank channel; and the shank outer cylindrical defines first and second shank radial through holes that extend radially outward therethrough; and the first and second shank radial through holes are respectively aligned with the manifold outlet and manifold exhaust conduits.

Disclosed is a method of manufacturing a valve assembly, comprising: forming a manifold for connecting to a valve, which includes: forming a manifold inlet body portion defining: a manifold internal surface that defines a manifold channel extending along a first axis; and a first manifold external surface with a manifold inlet opening that opens to the manifold channel; forming a manifold outlet port, and a manifold outlet conduit that extends along a second axis from the manifold inlet body portion to the manifold outlet port; forming a manifold exhaust port, and a manifold exhaust conduit that extends along a third axis from the manifold inlet body portion to the manifold exhaust port, wherein the manifold exhaust and manifold outlet conduits are fluidly coupled via the manifold channel; forming heat fins that extend radially outward from the manifold exhaust conduit, between the manifold inlet body portion and the manifold exhaust port; and disposing a plug within the manifold exhaust conduit at the manifold exhaust port, wherein the plug is formed of a eutectic material.

In addition to one or more of the above disclosed aspects of the method, or as an alternate, the method further includes coupling the manifold channel to a valve outlet port of a valve body of the valve, via the manifold inlet opening.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
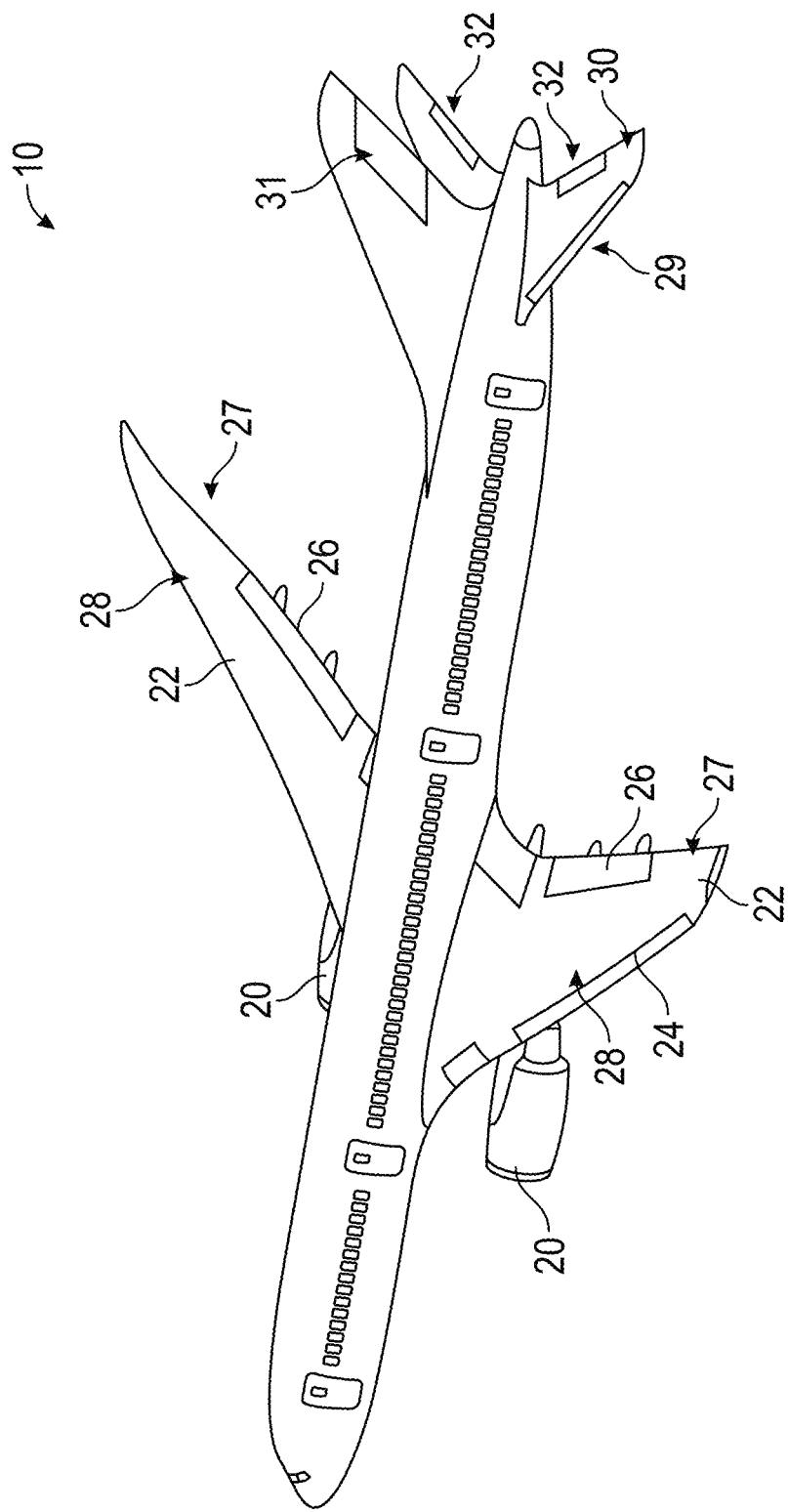
FIG. 1 shows an aircraft that may utilize features of the disclosed embodiments.

FIG. 1 illustrates an example of a commercial aircraft 10 having an aircraft engine 20 surrounded by (or otherwise carried in) a nacelle. The commercial aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems.

Figure 2:
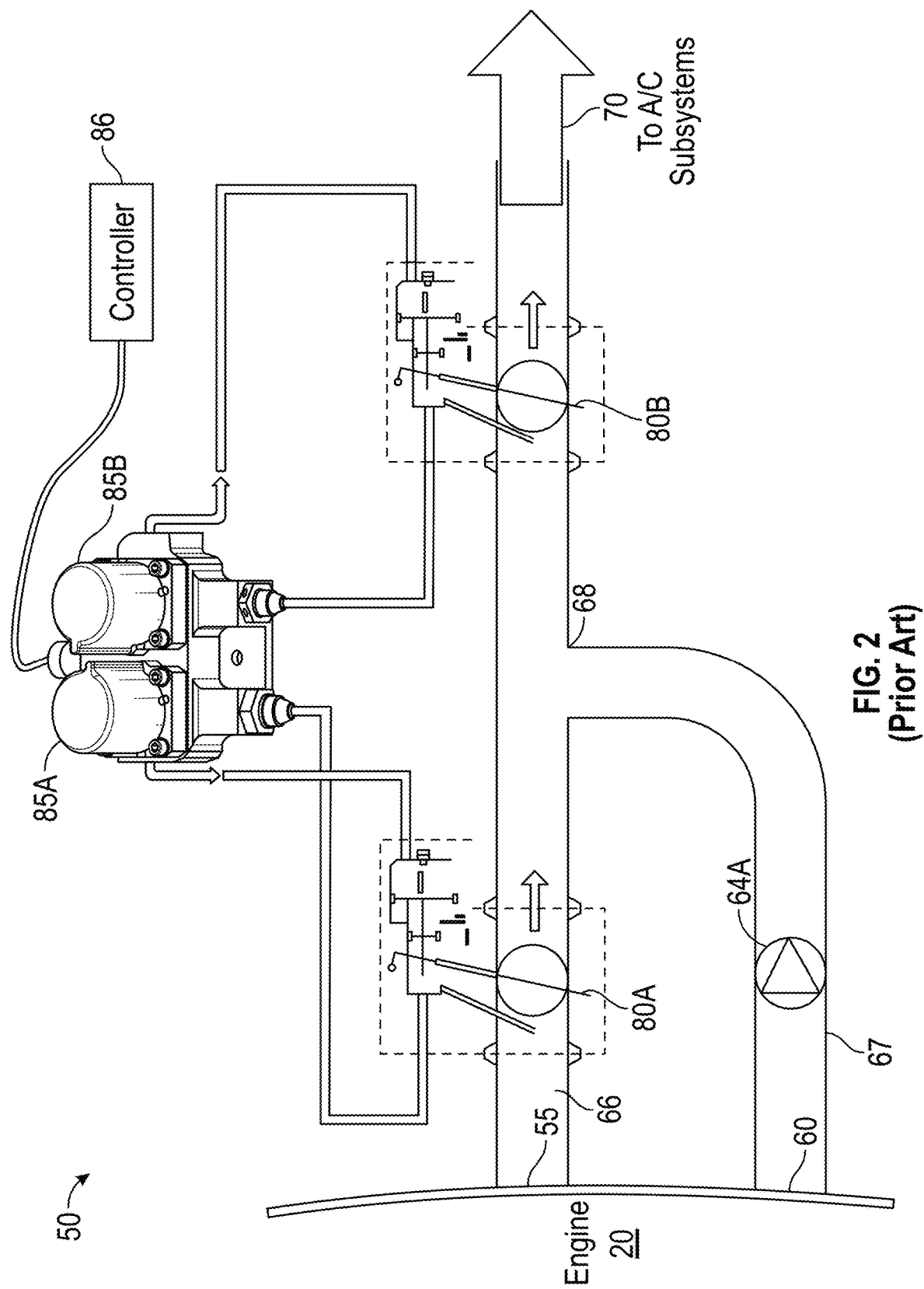
FIG. 2 shows an aircraft system, of the aircraft, utilizing a known valve assembly.

Turning to FIG. 2, the aircraft may include a bleed air system 50 to bleed air from the aircraft engine 20. In particular, the bleed air system 50 may be utilized to bleed engine air, e.g., from high and low pressure bleed ports (bleed ports) 55, 60, connected to respective bleed air conduits 65, 67, one or both of which may include a check valve 64. The bleed air conduits 65, 67 may mix bleed air at a bleed air junction 68, for the purpose of providing the bleed air to a subsystem 70, such as an anti-ice subsystem, an air conditioning subsystem, a cabin pressurization subsystem, etc.

The bleed air system 50 may include shutoff valves 80A, 80B, one of which is be connected to the bleed conduit 65 that is a high pressure conduit and one of which may be connected downstream of the bleed air junction 68. The downstream side of the bleed air junction 68 is between the junction 68 and the subsystem 70. An upstream side of the bleed air junction 68 is between the junction 68 and the engine 20. The shutoff valves 80A, 80B may regulate air extracted from the compressor, which may then be used by the subsystem 70. To control the shutoff valves 80A, 80B, the bleed air system 50 may utilize electro-mechanical valves (e.g., servo valves) 85A, 85B. The servo valves 85A, 85B may be known as dual-torque motor valves. The servo valves 85A, 85B may be controlled by a controller 86. The servo valves 85A, 85B may operate in extreme environments of high temperature (ambient and fluid) and pressure. Servo valves 85A and 85B can also be separate devices and do not need to be combined in the "dual" mode.

Due to the critical operation of the servo valves 85A, 85B, they are designed with safe-guards and controls so that in event of a system failure the shutoff valves operate predictably. Most system failure events have failure modes that can be predicted in advance, so that appropriate action may be taken to maintain operation. In the event of an engine fire, there may be an initial time period before the fire is detected. During this time, the shutoff valves 80A, 80B may need to close to prevent compressor gasses of the potentially compromised engine from reaching the subsystem 70. However, sudden extreme heat of an engine fire may cause the servo valves 85A, 85B to fail unpredictably, which may cause the shutoff valves 80A, 80B to undesirably remain open.

Figure 3:
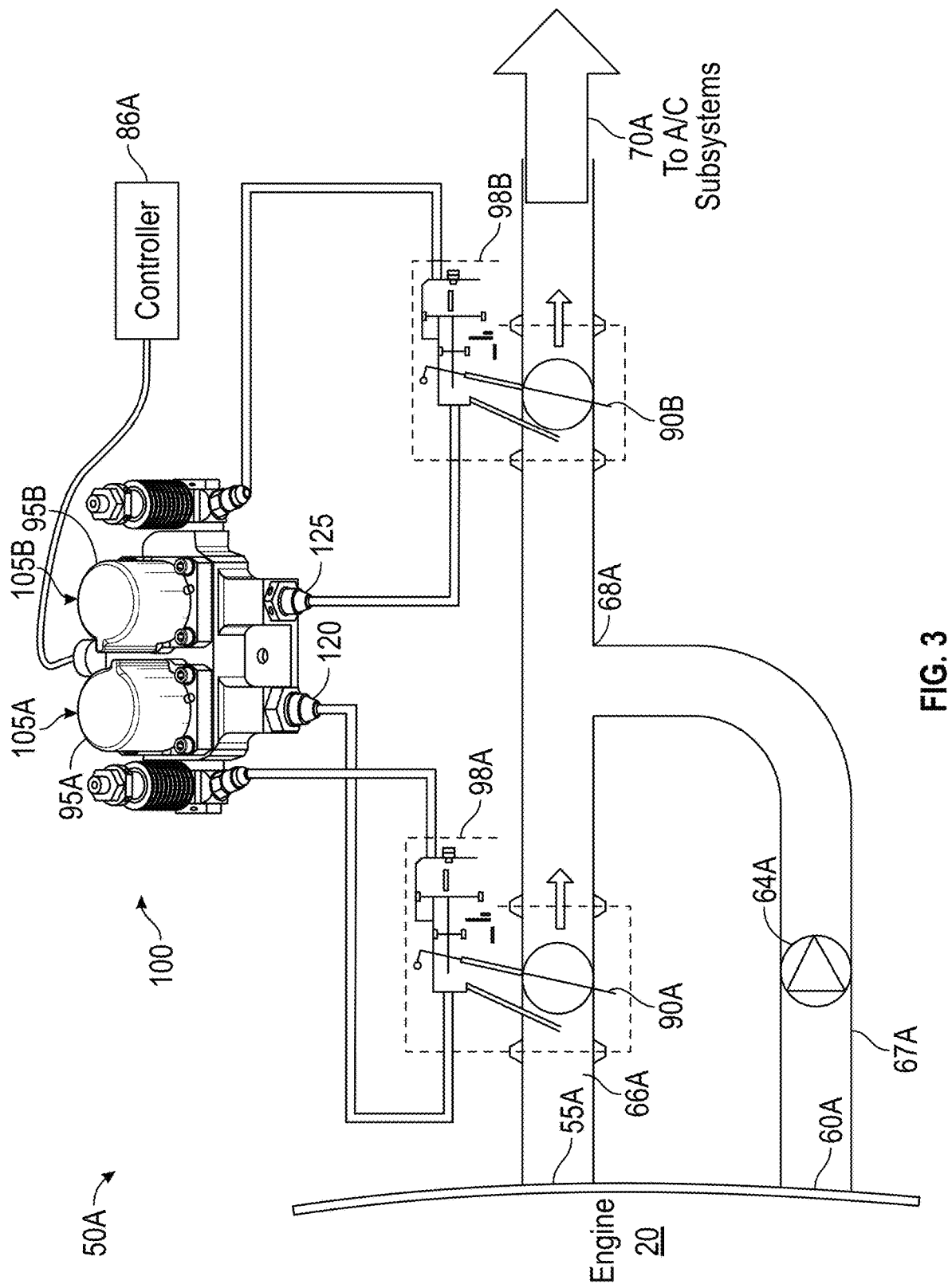
FIG. 3 shows an aircraft system, of the aircraft, utilizing a valve assembly according to a disclosed embodiment.

In view of the above concerns, reference now is made to FIG. 3. As with FIG. 2, the aircraft may include a bleed air system 50A utilized to bleed engine air, e.g., from high and low pressure bleed air ports (bleed air ports) 55A, 60A of the aircraft engine 20. The bleed ports 55A, 60A may be connected to respective bleed air conduits 65A, 67A, one or both of which may include a check valve 64A. The bleed air conduits 65A, 67A may mix bleed air at a bleed air junction 69A, for the purpose of providing the bleed air to a subsystem 70A, such as an anti-ice subsystem, an air conditioning subsystem, a cabin pressurization subsystem, etc.

The bleed air system 50A of the aircraft engine 20 may include shutoff valves 90A, 90B, one of which may be connected to the bleed air conduit 65A that is a high pressure bleed air conduit and one of which may be connected downstream of the bleed air junction 68A. The downstream side of the bleed air junction 68A is between the junction 68A and the subsystem 70A. An upstream side of the bleed air junction 68A is between the junction 68A and the engine 20. The shutoff valves 90A, 90B may operate, e.g., between an opened state and a closed state, to regulate airflow and pressure extracted from the engine compressor stage, for use by the subsystem 70A.

The bleed air system 50A may utilize a valve assembly 100 that includes servo valves 95A, 95B to respective shutoff valve flow control members 98A, 98B of the shutoff valves 90A, 90B. The shutoff valve flow control members 98A, 98B may be slidable members that engage the shutoff valves 90A, 90B. The servo valves 95A, 95B may respectively include motors 105A, 105B (which, as referenced herein, include respective motor housings) controlled by a controller 86A to independently control the shutoff valves 90A, 90B. Valve inlet ports 120, 125 of the servo valves 95A, 95B may be maintained at predetermined operational pressures to actuate the shutoff valves 90A, 90B. While servo valves 95A, 95B and motors 105A, 105B are illustrated, for simplicity, reference to the valve assembly 100 shall include reference the servo valve 95A and motor 105A.

Figure 4:
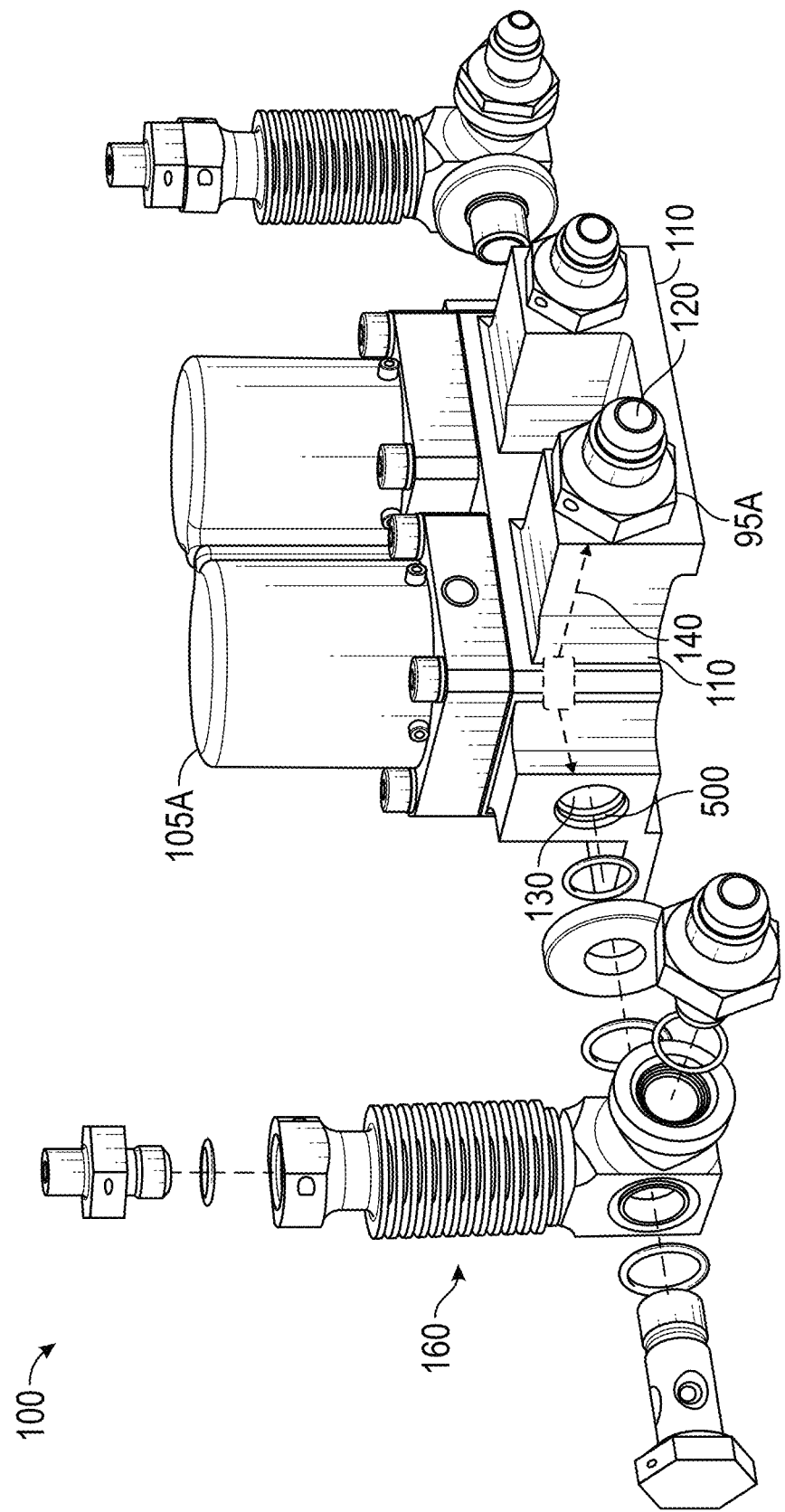
FIG. 4 is an exploded view of the valve assembly of FIG. 3, configured with a manifold having a eutectic plug according to an embodiment.
Figure 5A:
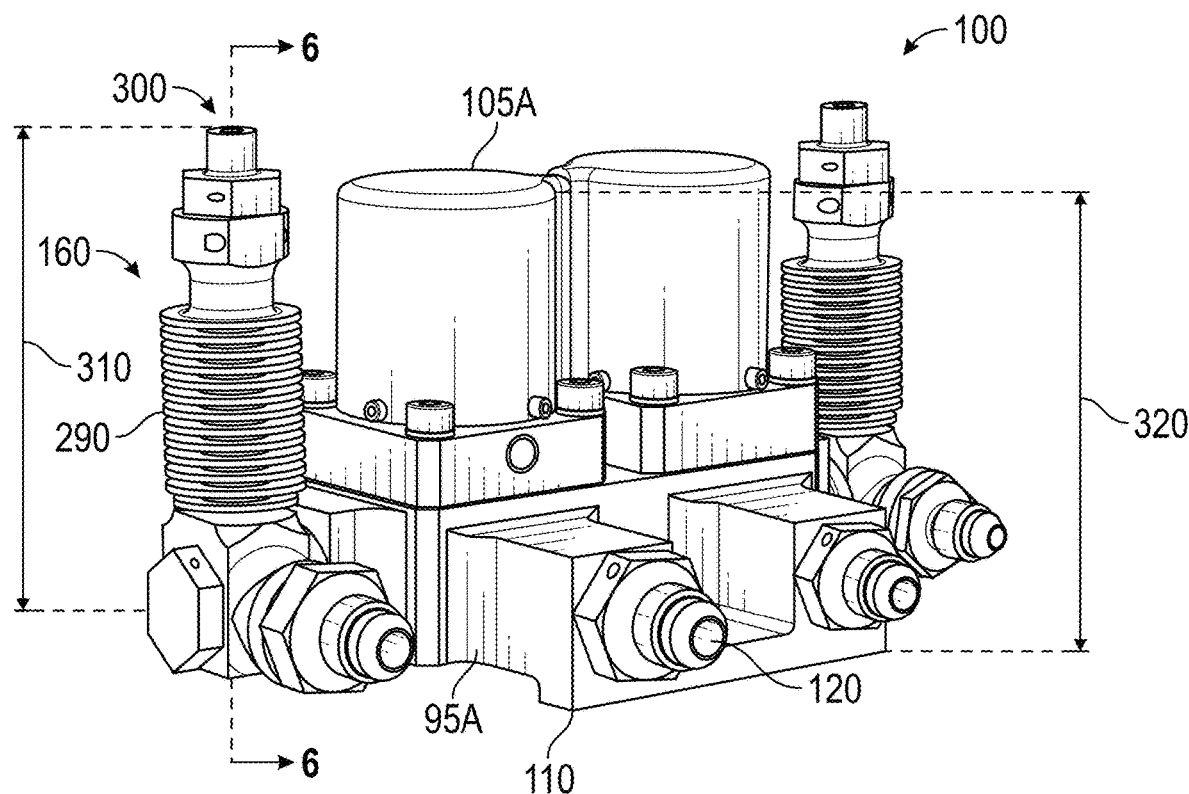
FIG. 5A is a perspective view of the valve assembly of FIG. 3.
Figure 6:
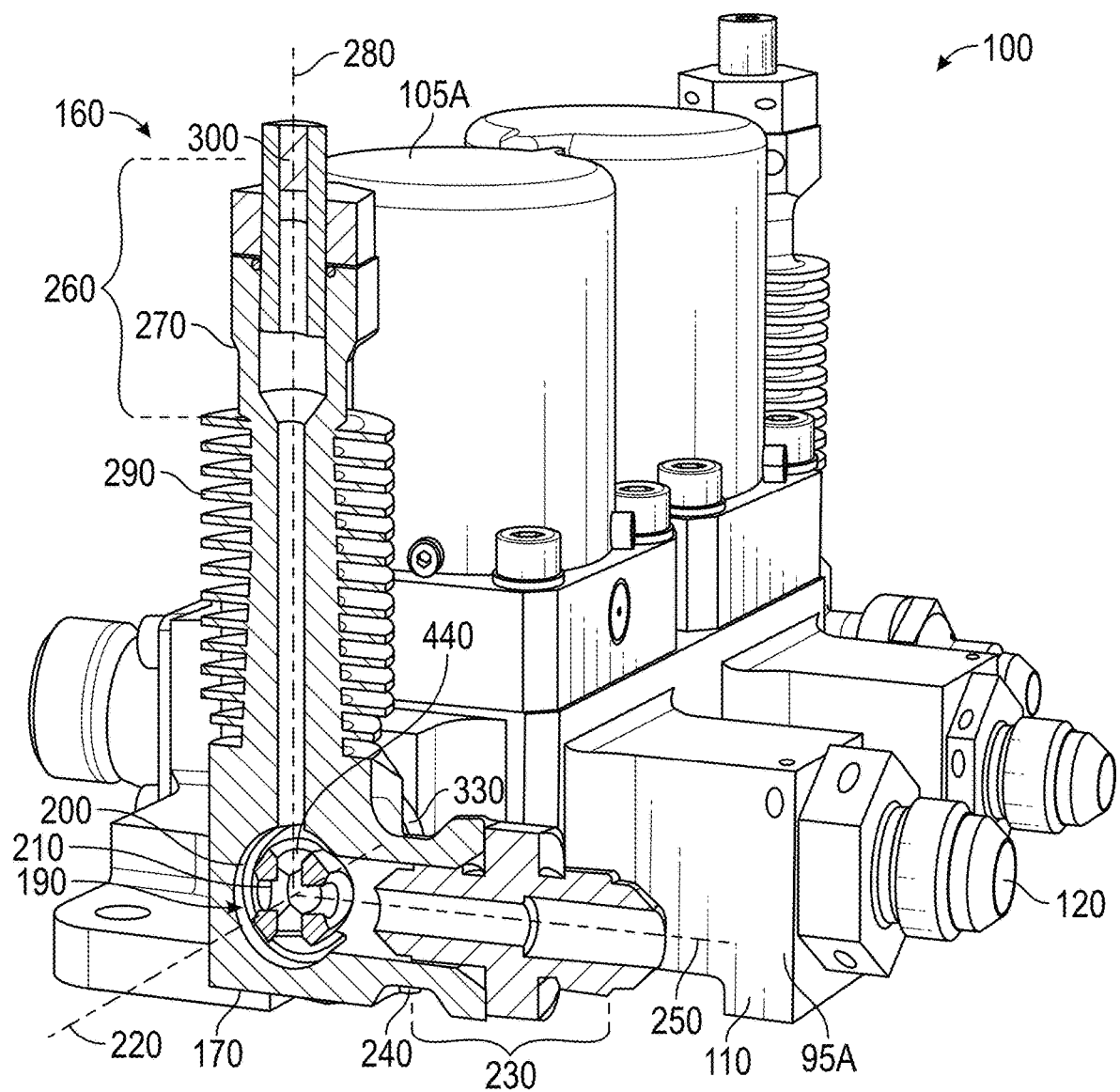
FIG. 6 is a further view of the valve assembly of FIG. 3, where the manifold is shown in a sectional view along section lines 6-6 shown in FIG. 5.

Turning to FIGS. 4, 5A and 6, additional details of the valve assembly 100 are shown. The valve assembly 100 includes the servo valve 95A (otherwise referred to as a valve) having a valve body 110 defining a valve inlet port 120, a valve outlet port 130 (FIG. 4), a valve passage 140 extending therebetween. A valve flow control member 150 (FIG. 4) is disposed within the valve passage 140 and configured to control flow between the valve inlet and valve outlet ports 120, 130. The valve flow control member 150 may be a disk or ball, as non-limiting examples. The motor 105A controls the valve flow control member 150.

A manifold 160 is connected to the valve body 110. With further reference to FIGS. 6-8, the manifold 160 includes a manifold inlet body portion 170 (FIG. 8A). The manifold inlet body portion 170 defines a manifold internal surface 200 (FIGS. 6-8) that defines a manifold channel 210 extending at least partially along a first axis 220. The manifold inlet body portion 170 further defines a first manifold external surface 180 (see also FIG. 8B) with a manifold inlet opening 190 that opens to the manifold channel 210. The manifold channel 210 is fluidly coupled to the valve outlet port 130 via the manifold inlet opening 190 (FIG. 4).

Remaining with FIGS. 6-8, the manifold 160 includes a manifold outlet port 230, and a manifold outlet conduit 240 extending along a second axis 250 from the manifold inlet body portion 170 to the manifold outlet port 230. The manifold 160 also includes a manifold exhaust port 260, and a manifold exhaust conduit 270 extending along a third axis 280 from the manifold inlet body portion 170 to the manifold exhaust port 260. With this configuration, the manifold outlet and manifold exhaust conduits 240, 270 are fluidly coupled to each other via the manifold channel 210.

Heat fins 290 extend radially outward from the manifold exhaust conduit 270, between the manifold inlet body portion 170 and the manifold exhaust port 260. The manifold 160 may be formed from a metal, and heat fins 290 on the manifold 160 may reject the heat from the air flow through the servo valve 95A and heat conduction from the servo valve 95A. The heat fins 290 increase a surface area of the manifold 160 compared to, e.g., a straight cylinder. The utilization of the heat fins 290 enables placing the manifold 160 further inboard than shown in FIG. 5A so that the manifold 160 may be disposed against the valve body 110 as show in FIG. 5B. The number and size of the heat fins 290 can be adjusted depending on how close the manifold 160 is to the valve body 110.

A plug 300 is disposed within the manifold exhaust conduit 270 at the manifold exhaust port 260. The plug 300 is formed of a eutectic material (and thus may be considered eutectic fuse or eutectic plug) which liquidizes at a predetermined temperature or a range of temperatures. In operation, the plug 300 seals the manifold exhaust conduit 270 (which may be referred to as an exhaust tower) from the ambient atmosphere. That is, during normal operation, the manifold 160, connected to the servo valve 95A, reduces the temperature at the plug 300 to below its liquidization temperature. The plug 300 is configured to melt (e.g., to fail) in the event of a fire but not otherwise. During a fire, the plug 300 melts, venting/dumping the manifold exhaust conduit 270 to the ambient atmosphere so that the servo valve 95A closes. The venting eliminates the servo pressure that may otherwise prevent the servo valve 95A from controlling the shutoff valve 90A to close. Thus, in the disclosed embodiments, the servo valve 95A is configured to normally operate the shutoff valve 90A in non-fire operating conditions and to close the shutoff valve 90A in the event of a fire.

Turning back to FIG. 5A, the manifold inlet body portion 170 and manifold exhaust conduit 270 together define a manifold height 310 along the third axis 280. As indicated, the valve assembly 100 further includes the motor 105A that is operationally connected to the valve flow control member 150. The motor 105A and the valve body 110 together define a valve height 320 along the third axis 280. The manifold height 310 is greater than the valve height 320. With this height, the number of heat fins 290 may increase to an amount that enables the dissipation of heat during normal operation so that the plug 300 remains in a solid form.

With continued reference to FIGS. 6-8, in one embodiment a thermal spacer 330 may be disposed between the manifold 160 and the valve body 110. The thermal spacer 330, which may be an insulator disk, may be formed from a low conductivity, non-metallic thermal insulator material. Other thermal insulating materials may be selected as deemed appropriate. The thermal spacer 330 may help to reduce thermal conductivity to the manifold exhaust conduit 270 of the manifold 160, e.g., where the plug 300 is located. The use of the thermal spacer 330 may be optional in certain embodiments.

In one embodiment, the manifold inlet body portion 170 defines a second manifold external surface 340 (FIG. 7A) spaced apart from the first manifold external surface 180 along the first axis 220. A bolt opening 350, which opens to the manifold channel 210, is defined on the second manifold external surface 340.

Figure 8C:
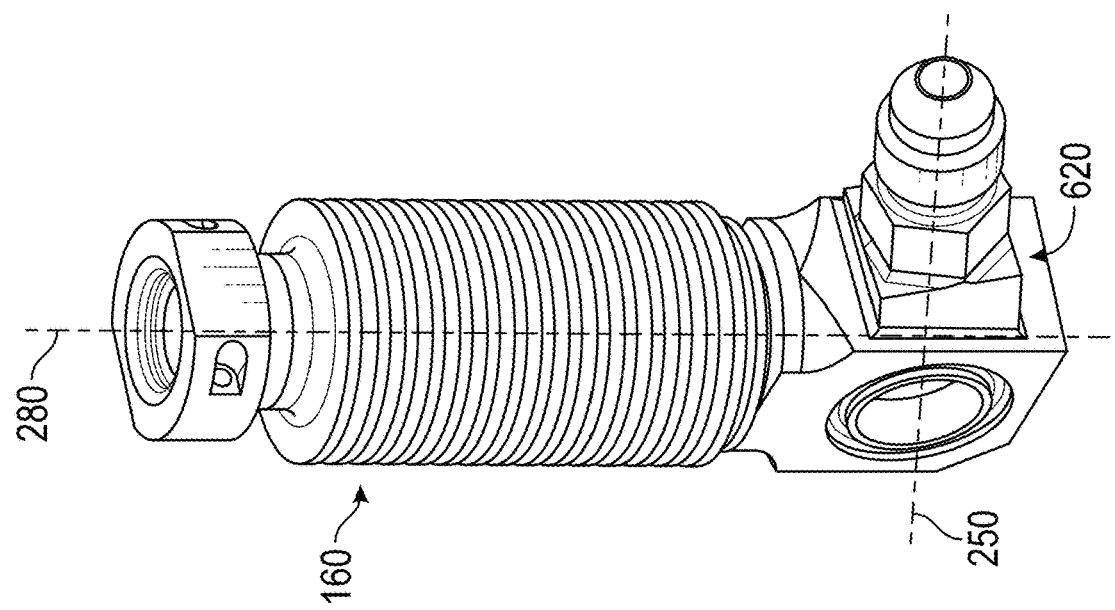
FIG. 8C shows an embodiment in which the tube fitting and manifold are integral with each other.
Figure 8B:
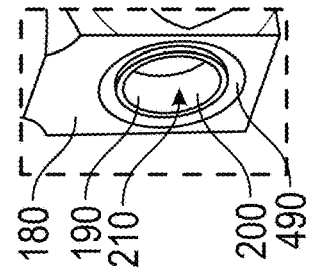
FIG. 8B shows a section 8B identified in FIG. 8A of the manifold without the bolt, thermal spacer and O-rings.
Figure 8A:
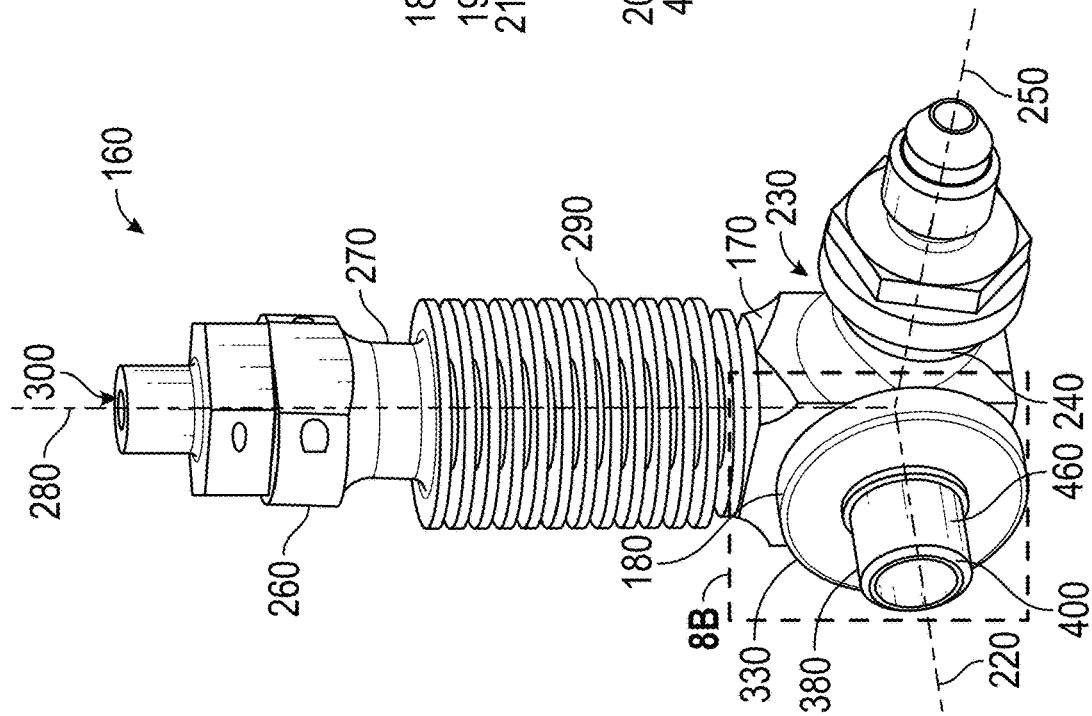
FIG. 8A shows the manifold that is shown in FIG. 4A viewed from an opposite side compared with the side shown in FIG. 7A.
Figure 9A:
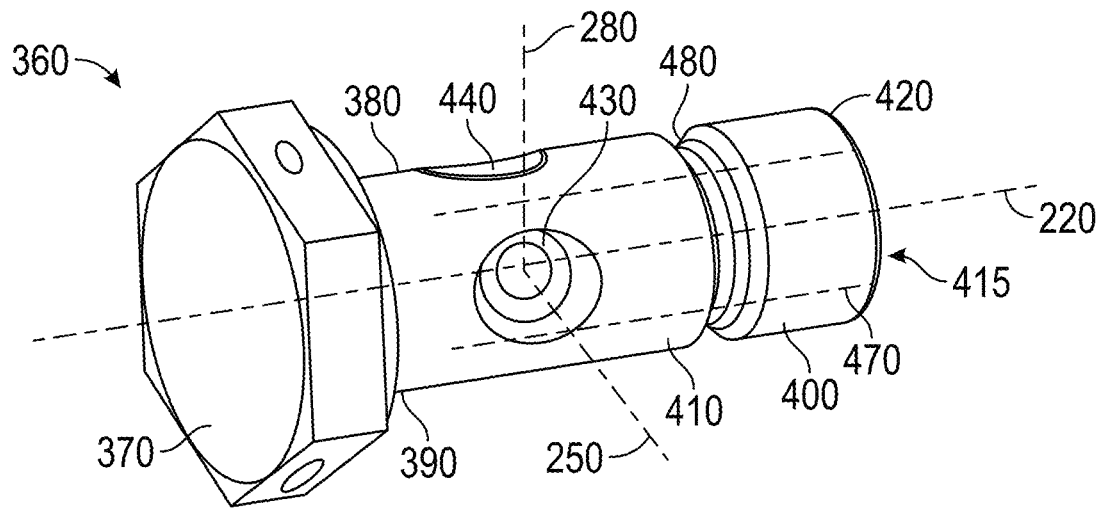
FIGS. 9A-9B show different embodiments of a bolt of the valve assembly.

With reference to FIG. 9A, the valve assembly 100 may include a bolt 360 that defines a bolt head 370 and a bolt shank 380. The bolt shank 380 may include first and second shank ends 390, 400 spaced apart from each other along the first axis 220. The bolt head 370 may be formed at the first shank end 390. As assembled (FIGS. 7-8), the bolt 360 extends into the manifold channel 210 through the bolt opening 350, out of the manifold channel 210 and the manifold inlet opening 190, through the thermal spacer 330, and into the valve outlet port 130. This configuration secures the manifold 160 to the valve body 110.

The bolt shank 380 may further define a shank outer cylindrical wall 410 that extends axially between the first and second shank ends 390, 400 to define therethrough a shank channel 415. The shank outer cylindrical wall 410, at the second shank end 400, defines a shank axial port 420 that opens to the shank channel 415. The shank outer cylindrical wall 410 also defines first and second shank radial through holes 430, 440. The first and second shank radial through holes 430, 440 are respectively aligned with the manifold outlet and manifold exhaust conduits 240, 270.

Figure 9B:
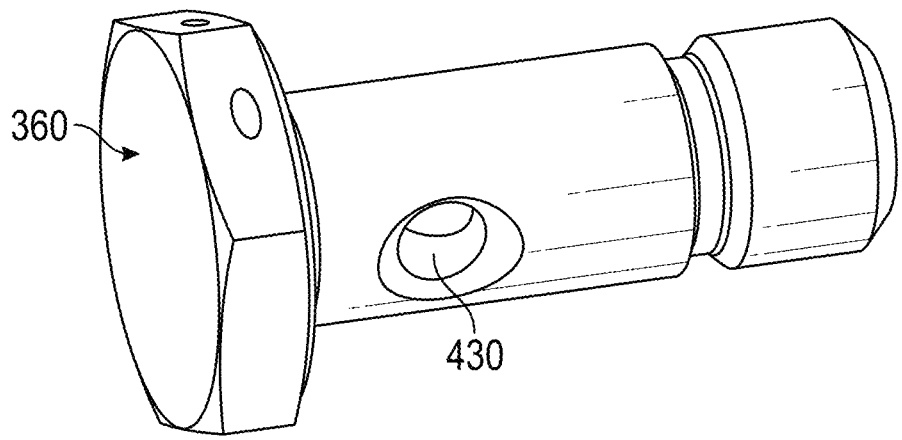

In an embodiment shown in FIG. 9B, the bolt 360 is the same as otherwise disclosed herein except for only having one (the first) shank radial through hole 430. That is, the second radial through hole 440 (FIG. 9A) is omitted for the purposes of providing additional strength to the bolt 360.

Figure 7A:
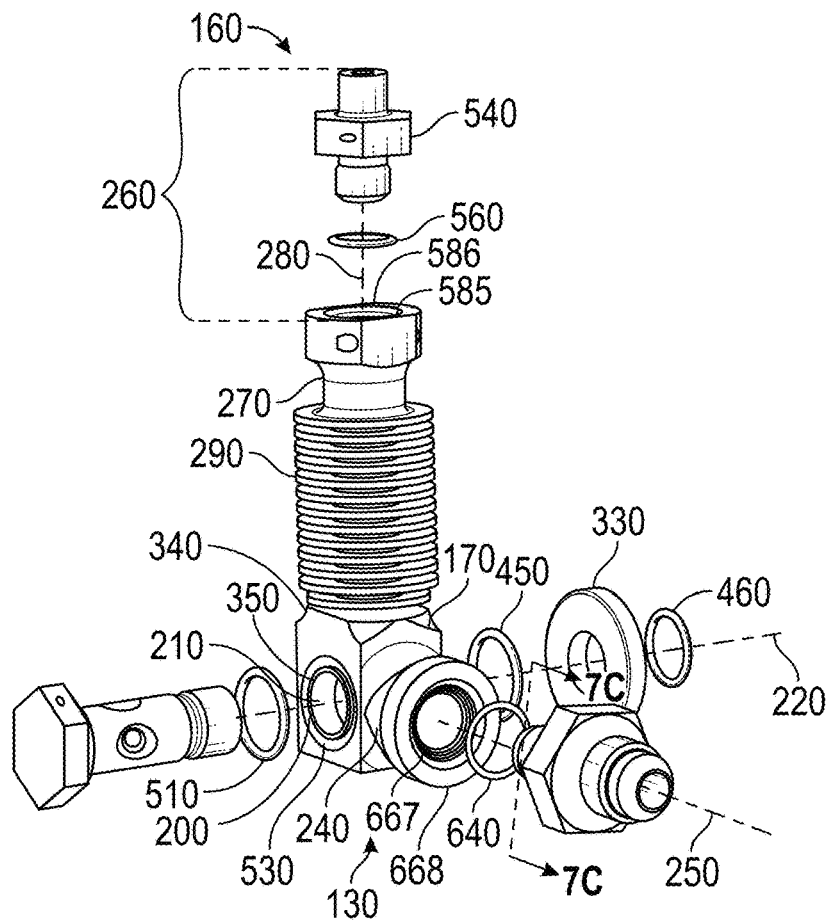
FIG. 7A shows the manifold shown in FIG. 4.

With further reference to FIG. 7A, the valve assembly 100 further includes first and second shank O-rings 450, 460 (the second shank O-ring 460 is also shown in FIG. 8A). As shown in FIG. 9, a shank outer surface 470 defines a first shank annular groove 480, axially intermediate the second shank end 400 and the first and second shank radial through holes 430, 440. The first manifold external surface 180 of the manifold inlet body portion 170 defines a first manifold inlet body O-ring groove 490 (FIG. 8B) about the manifold inlet opening 190. It is to be appreciated that metallic gaskets or metallic C-seals may be substituted for any of the O-rings within the scope of the disclosure.

The first shank O-ring 450 is configured to be seated between the first shank annular groove 480 and the first manifold inlet body O-ring groove 490. The second shank O-ring 460 is configured to be seated between the first shank annular groove 480 and a valve O-ring groove 500 (FIG. 4) formed about the valve outlet port 130. The thermal spacer 330 is configured to be seated between the first and second shank O-rings 450, 460 in the first shank annular groove 480 (see, e.g. FIG. 8A).

The valve assembly 100 further includes a third shank O-ring 510 (FIG. 7A). The shank outer surface 470 defines a second shank annular groove 520 (FIG. 9), at the first shank end 390. The second manifold external surface 340 of the inlet body portion 170 defines a second manifold inlet body O-ring groove 530 (FIG. 7A) about the bolt opening 350. The third shank O-ring 510 is seated between the second shank annular groove 520 and the second manifold inlet body O-ring groove 530.

With further reference to FIG. 7A, according to an embodiment, a portion of the manifold exhaust port 260 is formed by a plug fitting 540. The plug fitting 540 defines a plug fitting conduit with the plug 300 (FIG. 6) disposed therein. The plug fitting 540 is separable from the manifold exhaust conduit 270.

Figure 7B:
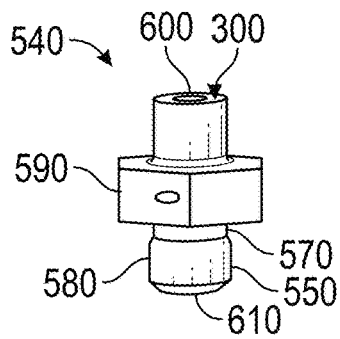
FIG. 7B shows a plug fitting of the assembly.

As shown in FIG. 7B, the plug fitting 540 further defines a plug fitting stem 550 that is configured to be received within the manifold exhaust conduit 270 to secure the plug fitting 540 thereto. A plug fitting O-ring 560 is seated around the plug fitting stem 550. More specifically, the plug fitting stem 550 defines a plug fitting O-ring groove 570 on a plug fitting outer surface 580. The plug fitting O-ring 560 is disposed between the plug fitting O-ring groove 570 and a complimentary exhaust conduit groove 585 is formed in the axial outer end 586 of the manifold exhaust conduit 270. Additionally, the plug fitting 540 includes a plug fitting nut portion 590 (e.g., a hex nut) intermediate opposing outer and inner plug fitting axial ends 600, 610. With this configuration the plug fitting O-ring groove 570 is located axially against the plug fitting nut portion 590. The manifold exhaust conduit 270 may be formed with a hex surface (e.g., forming an effective nut surface) at the axial outer end 586 to facilitate tightening the plug fitting 540 thereto.

Figure 7C:
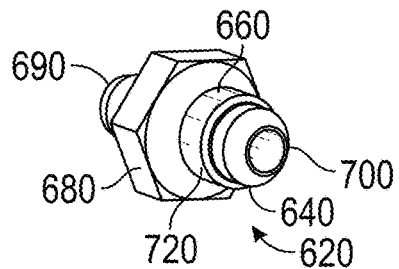
FIG. 7C shows a tube fitting along view lines 7C-7C shown in FIG. 7A.

According to an embodiment, a portion of the manifold outlet port 230 is formed by a tube fitting 620 (FIG. 7C). The tube fitting 620 is separable from the manifold outlet conduit 240. The tube fitting 620 defines a tube fitting conduit with a tube fitting stem 640 that is configured to be received within the manifold outlet conduit 240 (FIG. 7A) to secure the tube fitting 620 thereto.

Figure 5B:
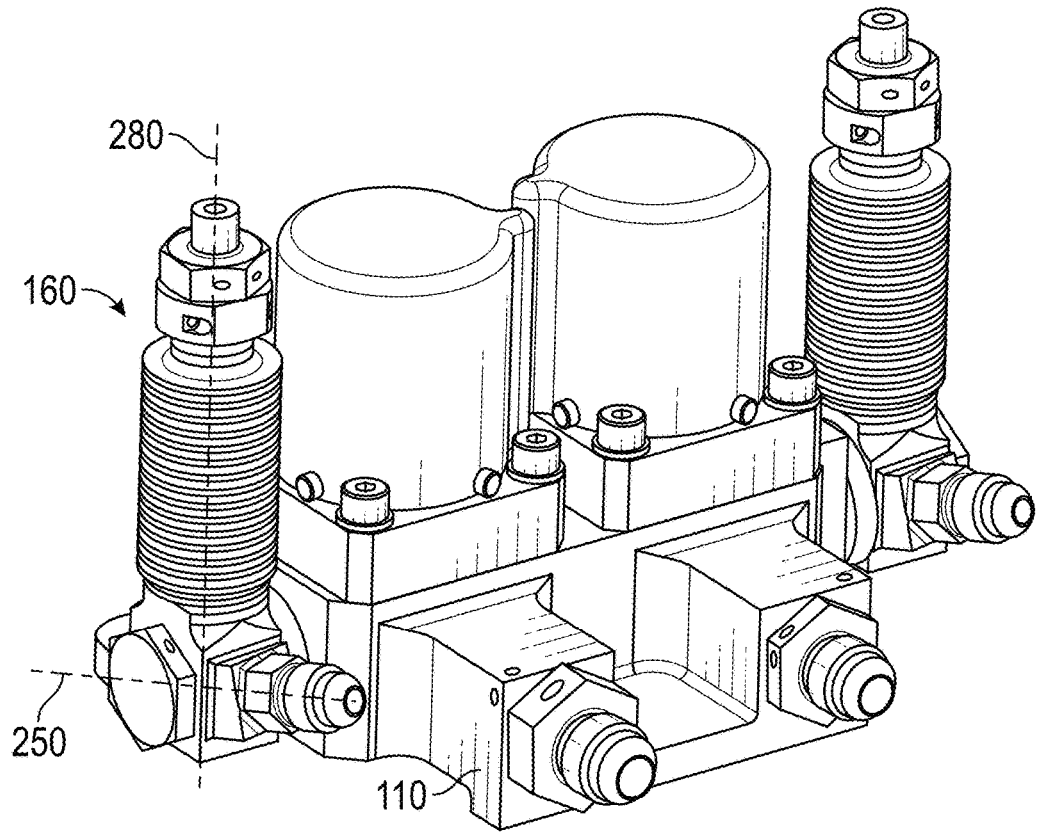
FIG. 5B is another embodiment in the view of FIG. 5A, wherein the manifold is further inboard to the motor than in FIG. 5A and wherein an outlet axis is skewed form normal to a manifold exhaust conduit axis.

In one embodiment shown in FIG. 8C, the tube fitting 620 is integral with the manifold 160 so that the two components are inseparable. Such embodiment would bypass the need for the tube fitting O-ring 640. As further shown in FIG. 8C, the second axis 250A of the manifold outlet port 230 may be skewed from normal to the 3$^{rd}$ axis 280 as may be required for fitting of the components within an engine. This is also shown in FIG. 5B. The manifold 160 is otherwise the same as otherwise disclosed herein.

A tube fitting O-ring 650 is seated around the tube fitting stem 640. More specifically, the tube fitting stem 640 defines a tube fitting O-ring groove 660 on a tube fitting outer surface 670. The tube fitting O-ring 650 is disposed between the tube fitting O-ring groove 660 and a complimentary outlet conduit groove 667 formed in the axial outer end 668 of the manifold outlet conduit 240. Additionally, the tube fitting 620 includes a tube fitting nut portion 680 (e.g., a hex nut) intermediate opposing outer and inner tube fitting axial ends 690, 700. With this configuration, the tube fitting O-ring groove 660 is located axially against the tube fitting nut portion 680.

Figure 10:
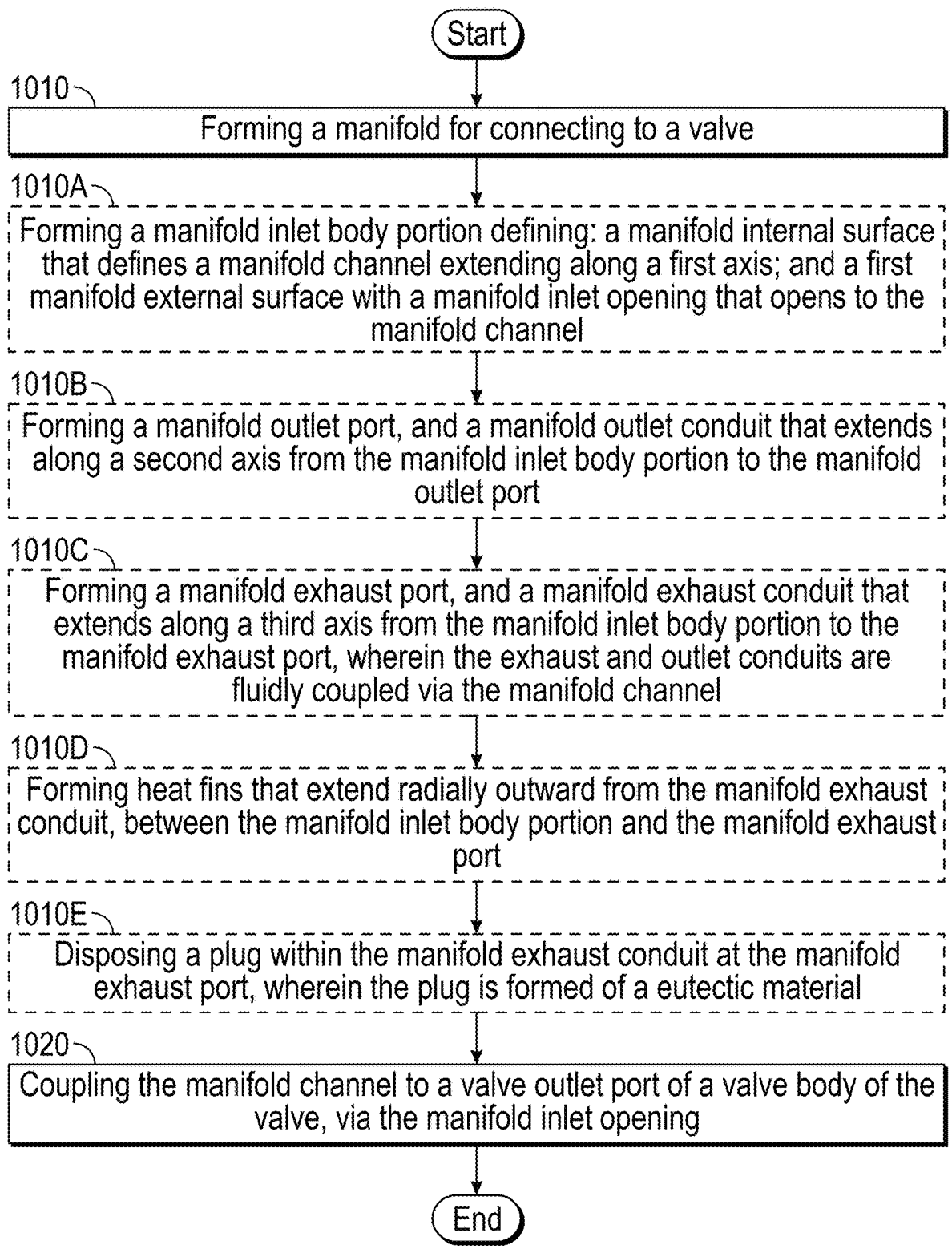
FIG. 10 is a flowchart showing a method of manufacturing the valve of FIG. 2.

Turning to FIG. 10, further disclosed is a method of manufacturing the valve assembly 100. As shown in block 1010, the method includes forming the manifold 160 for connecting to the servo valve 95A of the servo valve 95A.

As shown in block 1010A, forming the manifold 160 includes forming the manifold inlet body portion 170 defining the manifold internal surface 200 that defines the manifold channel 210 extending along the first axis 220, and the first manifold external surface 180 with the manifold inlet opening 190 that opens to the manifold channel 210.

As shown in block 1010B, forming the manifold 160 includes forming the manifold outlet port 230, and the manifold outlet conduit 240 that extends along the second axis 250 from the manifold inlet body portion 170 to the manifold outlet port 230.

As shown in block 1010C, forming the manifold 160 includes forming the manifold exhaust port 260, and the manifold exhaust conduit 270 that extends along the third axis 280 from the manifold inlet body portion 170 to the manifold exhaust port 260. As indicated, the manifold outlet and manifold exhaust conduits 240, 270 are fluidly coupled via the manifold channel 210.

As shown in block 1010D, forming the manifold 160 includes forming the heat fins 290 that extend radially outwardly from the manifold exhaust conduit 2400, between the manifold inlet body portion 170 and the manifold exhaust port 260.

As shown in block 1010E, forming the manifold 160 includes disposing the plug 300 within the manifold exhaust conduit 270 at the manifold exhaust port 260. As indicated, the plug 300 is formed of a eutectic material.

As shown in block 1020, the method includes coupling the manifold channel 210 to the valve outlet port 130 of the valve body 110 of the servo valve 95A, via the manifold inlet opening 190. As indicated, the servo valve 95A has the valve body 110, which defines the valve inlet port 120, the valve outlet port 130 and the valve passage 140 extending therebetween. The valve flow control member 150 is disposed within the valve passage 140 and configured to control flow between the valve inlet and valve outlet ports 120, 130.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A valve assembly comprising:
   a valve having a valve body, the valve body defining a valve inlet port, a valve outlet port, and a valve flow control member operationally disposed between the valve inlet port and the valve outlet port;
   a manifold connected to the valve body at the valve outlet port, wherein the manifold comprises:
   a manifold inlet body portion defining:
      a manifold internal surface defining a manifold channel extending at least partially along a first axis; and
      a first manifold external surface defining a manifold inlet opening that opens to the manifold channel, wherein the manifold channel is fluidly coupled to the valve outlet port via the manifold inlet opening;

a manifold outlet port, and a manifold outlet conduit extending along a second axis from the manifold inlet body portion to the manifold outlet port;

a manifold exhaust port, and a manifold exhaust conduit extending along a third axis from the manifold inlet body portion to the manifold exhaust port, wherein the first, second and third axes have a common intersection, and wherein the manifold exhaust and manifold outlet conduits are fluidly coupled to each other via the manifold channel, and wherein heat fins extend radially outward from the manifold exhaust conduit between the manifold inlet body portion and the manifold exhaust port; and a plug disposed within the manifold exhaust conduit at the manifold exhaust port, wherein the plug is formed of a eutectic material.

2. The valve assembly of claim 1, wherein
the manifold inlet body portion and the manifold exhaust conduit together define a manifold height along the third axis, and
the valve assembly further includes:
  a motor operationally connected to the valve flow control member; and
  wherein the motor and the valve body together define a valve height along the third axis, and
  wherein the manifold height is greater than the valve height.

3. The valve assembly of claim 1, comprising:
a thermal spacer between the manifold and the valve body.

4. The valve assembly of claim 3, wherein:
the manifold inlet body portion defines a second manifold external surface spaced apart from the first manifold external surface along the first axis; and
the second manifold external surface defines a bolt opening to the manifold channel.

5. The valve assembly of claim 4, further comprising
a bolt that has head and a shank, wherein the shank includes:
  first and second shank ends, spaced apart from each other along the first axis, wherein the head is formed at the first shank end,
  wherein the bolt extends into the manifold channel through the bolt opening, out of the manifold channel and the manifold inlet opening, through the thermal spacer, and into the valve outlet port to secure the manifold to the valve body.

6. The valve assembly of claim 5, wherein
the shank further includes:
  a shank outer cylindrical wall that extends axially between the first and second shank ends to define a shank channel therethrough,
  wherein:
    the second shank end of the shank outer cylindrical wall defines a shank axial port that opens to the shank channel;
    the shank outer cylindrical defines first and second shank radial through holes that extend radially outward therethrough; and
    the first and second shank radial through holes are respectively aligned with the manifold outlet and manifold exhaust conduits.

7. The valve assembly of claim 6, further comprising
first and second shank O-rings, wherein:
  a shank outer surface defines a first shank annular groove, axially intermediate the second shank end and the first and second shank radial through holes; and
  the first manifold external surface of the manifold inlet body portion defines a first manifold inlet body O-ring groove about the manifold inlet opening,
  wherein:
    the first shank O-ring is configured to be seated between the first shank annular groove and the first manifold inlet body O-ring groove;
    the second shank O-ring is configured to be seated between the first shank annular groove and a valve O-ring groove formed about the valve outlet port; and
    the thermal spacer is configured to be seated between the first and second shank O-rings in the first shank annular groove.

8. The valve assembly of claim 7, further comprising
a third shank O-ring, wherein:
  the shank outer surface defines a second shank annular groove, located at the first shank end; and
  the second manifold external surface of the manifold inlet body portion defines a second manifold inlet body O-ring groove about the bolt opening,
  wherein the third shank O-ring is seated between the second shank annular groove and the second manifold inlet body O-ring groove.

9. The valve assembly of claim 1, wherein:
a portion of the manifold exhaust port is formed by a plug fitting, wherein the plug fitting defines a plug fitting conduit with the plug disposed therein, and is separable from the manifold exhaust conduit; and
the plug fitting defines a plug fitting stem that is configured to be received within the manifold exhaust conduit to secure the plug fitting thereto.

10. The valve assembly of claim 9, further including:
a plug fitting O-ring,
wherein the plug fitting stem defines a plug fitting O-ring groove on its outer surface that is configured to seat the plug fitting O-ring, and
wherein the plug fitting O-ring is disposed between the plug fitting O-ring groove and a complimentary exhaust conduit groove formed in the axial outer end of the manifold exhaust conduit.

11. The valve assembly of claim 1, wherein:
a portion of the manifold outlet port is formed by a tube fitting, wherein the tube fitting is separable from the manifold outlet conduit; and
the tube fitting defines a tube fitting conduit having a tube fitting stem that is configured to be received within the manifold outlet conduit to secure the tube fitting thereto.

12. The valve assembly of claim 11, further including:
a tube fitting O-ring,
wherein the tube fitting stem defines a tube fitting O-ring groove on its outer surface that is configured to seat the tube fitting O-ring,
wherein the tube fitting O-ring is disposed between the tube fitting O-ring groove and a complimentary outlet conduit groove formed in the axial outer end of the manifold outlet conduit.

13. An aircraft engine bleed air system, comprising:
a shutoff valve connected between one of high pressure and low pressure engine bleed air conduits and an aircraft subsystem;

a valve assembly operationally connected to the shutoff valve, the valve assembly comprising:
a valve having a valve body, the valve body defining a valve inlet port, a valve outlet port, and a valve flow control member operationally disposed between the valve inlet port and the valve outlet port;
a manifold connected to the valve body at the valve outlet port, wherein the manifold comprises:
a manifold inlet body portion defining:
a manifold internal surface defining a manifold channel extending at least partially along a first axis; and
a first manifold external surface defining a manifold inlet opening that opens to the manifold channel, wherein the manifold channel is fluidly coupled to the valve outlet port via the manifold inlet opening;
a manifold outlet port, and a manifold outlet conduit extending along a second axis from the manifold inlet body portion to the manifold outlet port;
a manifold exhaust port, and a manifold exhaust conduit extending along a third axis from the manifold inlet body portion to the manifold exhaust port, wherein the first, second and third axes have a common intersection, and
wherein the manifold exhaust and manifold outlet conduits are fluidly coupled to each other via the manifold channel, and
wherein heat fins extend radially outward from the manifold exhaust conduit between the manifold inlet body portion and the manifold exhaust port; and
a plug disposed within the manifold exhaust conduit at the manifold exhaust port, wherein the plug is formed of a eutectic material,
wherein the valve inlet port is fluidly coupled to the one of the high and low pressure engine bleed air conduits and the valve outlet port is operationally connected to the shutoff valve.

14. The aircraft engine bleed air system of claim 13, wherein:
the manifold inlet body portion and the manifold exhaust conduit together define a manifold height along the third axis, and
the valve assembly further includes:
a motor operationally connected to the valve flow control member; and
wherein the motor and the valve body together define a valve height along the third axis, and
wherein the manifold height is greater than the valve height.

15. The aircraft engine bleed air system of claim 13, comprising:
a thermal spacer between the manifold and the valve body.

16. The aircraft engine bleed air system of claim 15, wherein:
the manifold inlet body portion defines a second manifold external surface spaced apart from the first manifold external surface along the first axis; and
the second manifold external surface defines a bolt opening to the manifold channel.

17. The aircraft engine bleed air system of claim 16, further comprising
a bolt that has a head and a shank, wherein the shank includes:
first and second shank ends, spaced apart from each other along the first axis, wherein the head is formed at the first shank end,
wherein the bolt extends into the manifold channel through the bolt opening, out of the manifold channel and the manifold inlet opening, through the thermal spacer, and into the valve outlet port to secure the manifold to the valve body.

18. The aircraft engine bleed air system of claim 17, wherein
the shank further includes:
a shank outer cylindrical wall that extends axially between the first and second shank ends to define a shank channel therethrough,
wherein:
the second shank end of the shank outer cylindrical wall defines a shank axial port that opens to the shank channel; and
the shank outer cylindrical defines first and second shank radial through holes that extend radially outward therethrough; and
the first and second shank radial through holes are respectively aligned with the manifold outlet and manifold exhaust conduits.

19. A method of manufacturing a valve assembly, comprising:
forming a manifold for connecting to a valve, which includes:
forming a manifold inlet body portion defining:
a manifold internal surface that defines a manifold channel extending along a first axis; and
a first manifold external surface with a manifold inlet opening that opens to the manifold channel;
forming a manifold outlet port, and a manifold outlet conduit that extends along a second axis from the manifold inlet body portion to the manifold outlet port;
forming a manifold exhaust port, and a manifold exhaust conduit that extends along a third axis from the manifold inlet body portion to the manifold exhaust port, wherein the first, second and third axes have a common intersection, and wherein the manifold exhaust and manifold outlet conduits are fluidly coupled via the manifold channel;
forming heat fins that extend radially outward from the manifold exhaust conduit, between the manifold inlet body portion and the manifold exhaust port; and
disposing a plug within the manifold exhaust conduit at the manifold exhaust port, wherein the plug is formed of a eutectic material.

20. The method of claim 19, further comprising:
coupling the manifold channel to a valve outlet port of a valve body of the valve, via the manifold inlet opening.

* * * * *